United States Patent Office 3,646,129
Patented Feb. 29, 1972

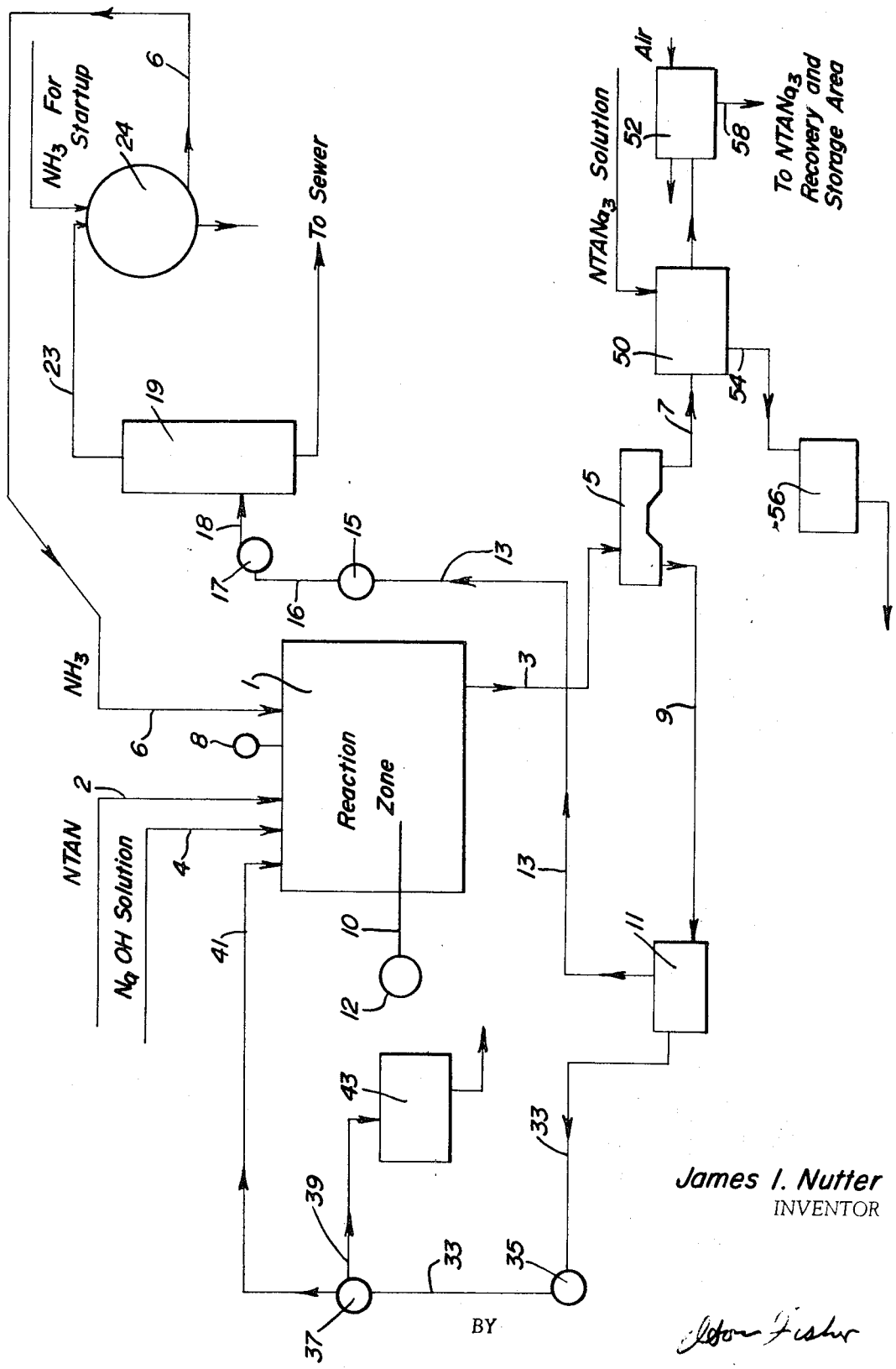

3,646,129
PROCESS FOR PREPARING SODIUM
NITRILOTRIACETATE
James I. Nutter, Fairview, Pa., assignor to
W. R. Grace & Co., New York, N.Y.
Continuation-in-part of application Ser. No. 666,020,
Sept. 7, 1967. This application July 14, 1969, Ser.
No. 841,519
Int. Cl. C07c 101/20
U.S. Cl. 260—534 E
10 Claims

ABSTRACT OF THE DISCLOSURE

In abstract, this invention is directed to a process for precipitating sodium nitrilotriacetate from an aqueous solution thereof by adding sufficient ammonia to bring the ammonia concentration thereof to about 50–300 grams per liter of solution to precipitate sodium nitrilotriacetonitrile therefrom.

CROSS REFERENCE TO RELATED APPLICATION

This is a continuation-in-part of my copending application Ser. No. 666,020, filed Sept. 7, 1967 and now abandoned.

SUMMARY OF THE INVENTION

In summary, this invention is directed to a process for precipitating sodium nitrilotriacetate ($NTANa_3$) from an aqueous solution consisting essentially of (a) water, (b) 100–500 grams per liter of sodium nitrilotriacetate, and (c) about 1.5–70 grams per liter of sodium hydroxide, comprising adjusting the ammonia concentration of said aqueous solution to about 50–300 grams per liter while maintaining the temperature of said aqueous solution within the range of about 10–225° C.

BRIEF DESCRIPTION OF THE DRAWING

The drawing is a flowsheet of a preferred embodiment for conducting the process of the instant invention wherein ammonia is added to an aqueous sodium nitrilotriacetate solution in a reaction zone in which said solution is prepared by the alkaline hydrolysis of nitrilotriacetonitrile (NTAN).

DESCRIPTION OF PREFERRED EMBODIMENTS

In a preferred embodiment ("Embodiment A") this invention is directed to a process for recovering solid sodium nitrilotriacetate from a first aqueous solution having a temperature of about 80–225° C. and consisting essentially of water, sodium nitrilotriacetate, and sodium hydroxide, the sodium nitrilotriacetate concentration being about 100–400 grams per liter, the sodium hydroxide concentration being about 1.5–60 grams per liter, and the ammonia concentration being less than about 10 grams per liter, comprising:

(a) Adding ammonia to said first solution while maintaining the temperature thereof at about 10–225° C. to precipitate sodium nitrilotriacetate therefrom and to form an aqueous mother liquor consisting essentially of; (i) water, (ii) about 50–250 grams per liter of sodium nitrilotriacetate, (iii) about 1.5–60 grams per liter of sodium hydroxide, and (iv) about 50–300 grams per liter of ammonia; and (b) Separating (e.g., by filtration, decantation, or centrifugation) and recovering the precipitated sodium nitriloriacetate.

In preferred embodiments of the process set forth in Embodiment A, supra;

(1) The temperature of the first aqueous solution is about 95–125° C.

(2) The sodium nitrilotriacetate concentration of the first aqueous solution is about 200–400 grams per liter.

(3) The sodium hydroxide concentration of the first aqueous solution is about 5–30 grams per liter.

(4) The first aqueous solution contains less than about 5 grams per liter of ammonia.

(5) The temperature of the first aqueous solution is maintained within the range of about 85–150° C. while adding the ammonia thereto.

(6) The sodium nitrilotriacetate concentration of the aqueous mother liquor is about 60–200 grams per liter.

(7) The sodium hydroxide concentration of the mother liquor is about 10–40 grams per liter.

(8) The ammonia concentration of the mother liquor is about 100–250 grams per liter.

The process of the instant invention can be conducted in a continuous manner or it can be conducted batchwise. Generally, I prefer to conduct said process in a continuous manner, but excellent results have been obtained where operating this process batchwise.

Where making a continuous run I prefer to prepare an aqueous $NTANa_3$ solution by hydrolyzing NTAN with aqueous NaOH. For example, where starting a continuous run, I generally prefer to charge a reaction (or precipitation) zone, said zone being provided with agitator means and being designed to withstand pressures in excess of about 500 pounds per square inch absolute, with a "starting mixture," said starting mixture being prepared in the reaction zone by:

(a) Adding about a 34% solution of $NTANa_3$ to said zone;

(b) Adding enough sodium hydroxide to the $NTANa_3$ solution in said zone to bring the NaOH content thereof to about 2.5%;

(c) Maintaining the temperature in said zone within the range of about 10–225° C.; and (d) Adding ammonia to adjust the pressure within said zone to about 18–500 pounds per square inch absolute.

(However, I have also obtained excellent results where preprecipitating $NTANa_3$ from aqueous $NTANa_3$ solutions prepared by dissolving $NTANa_3$ and a lesser quantity (e.g., about 100–500 grams per liter of $NTANa_3$ and about 1.5–60 grams per liter of NaOH) in water and adjusting the temperature (if necessary) of the resulting solution to about 10–225° C. and passing such solution into the reaction zone where I add ammonia to precipitate $NTANa_3$ and to form an aqueous mother liquor.)

I prefer to conduct the run, while maintaining a temperature of about 80–225° C. within the reaction zone, by:

(a) Continuously passing NTAN, as solid crystalline NTAN, or as molten NTAN, or as an aqueous NTAN slurry, or as an aqueous NTAN solution into the reaction zone (Aqueous NTAN solutions and slurries analyzing about 10–90% NTAN are excellently adapted for use in the process of this invention);

(b) Continuously passing, a sodium hydroxide solution, said solution analyzing about 19–73% NaOH into said zone;

(c) Continuously passing ammonia into said zone to maintain an ammonia concentration of about 50–300 grams per liter in the liquor (liquid phase) within said zone;

(d) Continuously recycling concentrated mother liquor from a later-mentioned concentration step into said zone;

(e) Continuously removing product (precipitated $NTANa_3$) plus aqueous mother liquor from the reaction zone;

(f) Separating $NTANa_3$ from the aqueous mother liquor by centrifuging under a pressure substantially the same as that in the reaction zone or by filtering under pressure (e.g., having the upstream pressure substantially the same as that in the reaction zone and the downstream pressure somewhat lower);

(g) Washing the separated $NTANa_3$ with a saturated aqueous solution of $NTANa_3$;

(h) Drying the washed $NTANa_3$ at about 40–150° C., preferably at about 80–125° C.;

(i) Recovering the dried $NTANa_3$;

(j) Passing the separated aqueous mother liquor into a flashing zone where the pressure on said liquor is let down causing vaporization or ammonia and water from the aqueous mother liquor, thereby to yield; (i) a vapor phase consisting essentially of water vapor and ammonia; and (ii) a concentrated aqueous mother liquor, said mother liquor containing an appreciable quantity of sodium hydroxide; and (k) Condensing the vapor phase to yield an aqueous ammonia solution which can be distilled to yield substantially anhydrous ammonia which is recovered and water which can be discarded or used as plant process water.

If desired, the concentrated aqueous mother liquor can be recycled to the reaction zone, thereby to furnish sodium hydroxide to said zone.

Flow rates of reactants into the reaction zone and flow rates of product ($NTANa_3$) and aqueous mother liquor out of said zone are adjusted to maintain a residence time in said zone of about 0.1–300 minutes.

In general, materials are added to the reaction zone at such rates as to provide or furnish about 100–500 grams of NTAN per liter of solution. As noted supra, the temperature within the reaction zone is maintained within the range of about 10–225° C., preferably about 85–150° C., and for optimum results within the range of about 95–125° C. Material within the reaction zone is agitated by operating an agitating means positioned in said reaction zone during the run.

If desired, the product ($NTANa_3$) and mother liquor can be cooled, e.g., to within the range of about 10–60° C. before separating $NTANa_3$ from the mother liquor.

Ammonia (3 moles per mole of $NTANa_3$ produced) is a by-product of the hydrolysis of NTAN:

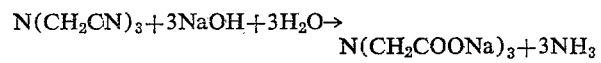
$$N(CH_2CN)_3 + 3NaOH + 3H_2O \rightarrow N(CH_2COONa)_3 + 3NH_3$$

Where preparing $NTANa_3$ solution by the hydrolysis of NTAN, such by-product ammonia is included in that present in the system, thereby to reduce the amount of ammonia which must be added from an outside or external source.

The process of my invention has given excellent results where conducted batchwise using an autoclave as reaction (or precipitation) zone, and, after precipitation is substantially complete, removing the precipitated $NTANa_3$ and mother liquor by centrifuging or filtering under pressure. Residence time in the precipitation zone (where operating batchwise) is about 0.1–300 minutes (preferably about 6–100 minutes) and the temperature within said zone is about 80–225° C. (preferably about 95–125° C.). However, as stated supra, I prefer to conduct the process in a continuous manner.

The instant invention will be better understood by referring to the following specific but nonlimiting examples. It is understood that said invention is not limited to these examples which are offered merely as illustrations, and it is also understood that modifications can be made without departing from the spirit and scope of the invention.

EXAMPLE I

This example shows that the addition of ammonia causes the precipitation of $NTANa_3$ from aqueous solutions consisting essentially of water, $NTANa_3$, and NaOH.

A first aqueous solution consisting essentially of water, about 300 grams per liter $NTANa_3$ (reported as $N(CH_2COONa)_3 \cdot H_2O$)

and about 30 grams per liter of NaOH was maintained in a closed system under a pressure of about one atmosphere absolute at about 100° C. No precipitate formed when said solution was allowed to stand under such conditions for about ½ hour. Ammonia was then added to the system to precipitate $NTANa_3$ and to produce a pressurized (ca. 200 pounds per square inch) system having an ammonia concentration in the resulting mother liquor at about 300 grams of $NH_3$ per liter. About 60% of the $N(CH_2COONa)_3 \cdot H_2O$ originally present in the first aqueous solution was precipitated by the added ammonia.

EXAMPLE II

The general procedure of Example I was repeated. However, in this instance the ammonia of Example I was replaced with nitrogen. No crystals of

$$N(CH_2COONa)_3 \cdot H_2O$$

were precipitated even after the pressurized system had been allowed to stand for about an hour.

This example serves as a control to show that pressurizing the $H_2O$—$NTANa_3$—NaOH system with nitrogen does not salt out $NTANa_3$.

EXAMPLE III

Referring to the drawing which is a flowsheet of a preferred method for conducting the process of this invention in a continuous manner.

At the start of this continuous run reaction zone 1, or precipitation zone 1, which was provided with a pressure gauge 8 and a thermocouple 10 communicating with a potentiometer 12 was charged with a mixture consisting essentially of about 34% $NTANa_3 \cdot H_2O$, 2.5% NaOH, and 63.5% $H_2O$, the temperature of the mixture being maintained at about 95° C. Then anhydrous ammonia was added to the reaction zone via line 6 to bring the pressure therein to about 200 pounds per square inch absolute. The resulting pressurized system was maintained at about 95° C. and 200 pounds per square inch absolute for about 50 minutes after which an aqueous solution of NTAN, said solution analyzing about 80% NTAN and having a temperature of about 95° C. and an aqueous solutio nof sodium hydroxide, said solution analyzing about 73% NaOH and having a temperature of about 95° C. and concentrated aqueous mother liquor from later-recited separating and concentrating steps were continuously fed into the reaction zone while adding anhydrous ammonia necessary to maintain the pressure within said zone at about 200 pounds per square inch. NTAN solution was added to the reaction zone via line 2, NaOH solution was added via line 4, concentrated aqueous mother liquor was added via line 41, and ammonia was added via line 6. Simultaneously, reaction product ($NTANa_3$ and ammonia-saturated aqueous mother liquor) was continuously removed from the reaction zone via line 3.

The flow rates were so adjusted that residence time in the reaction zone was about 50 minutes, and sodium hydroxide solution and concentrated aqueous mother liquor (which was rich in NaOH) were added to the reaction zone at such rates as to maintain the NaOH content of said zone at about 10 g.p.l., and, as stated supra, anhydrous ammonia was added to maintain the pressure in said zone at about 200 pounds per square inch absolute.

Reaction product passed, while under a pressure of about 200 pounds per square inch absolute and a temperature of about 95° C., from reaction zone 1, via line 3, to pressure centrifuge 5 where the hot slurry of $NTANa_3$ suspended in substantially ammonia-saturated mother liquor was centrifuged to give a product of crude $NTANa_3$ and a substantially ammonia-saturated mother liquor. The crude $NTANa_3$ passed from the centrifuge, via conveyor means 7, to an $NTANa_3$ processing area where the pressure on the crude $NTANa_3$ was let down to about atmospheric pressure in pressure let-down zone 48 and the crude $NTANa_3$ was then washed with washing liquor (a saturated aqueous solution of $NTANa_3$) in washing zone 50, dried in drying zone 52 at about 100° C., and recovered. Used washing liquor, leaving the washing zone via line 54, was recovered and sent to storage zone 56 (a storage tank). Dry NTANa₃ from dryer 52 passed via conveyor means 58 to a recovery and storage area where it (the dry NTANa₃) was recovered and stored.

The substantially ammonia-saturated aqueous mother liquor passed, under a pressure of about 200 pounds per square inch absolute, from centrifuge 5 to line 9 and then to flash chamber 11 where the pressure was let down to about 180 pounds per square inch absolute. Reducing the pressure on the mother liquor in flash chamber 11 caused a substantial portion of ammonia and some water to vaporize from the mother liquor, thereby forming a vapor and a concentrated aqueous mother liquor. The resulting vapor (NH₃ and water) passed from flash chamber 11 via line 13.

Vapor passed from line 13 to heat exchanger 15 where the vapor was totally condensed. The resulting liquid passed from heat exchanger 15, via line 16, pump 17 and line 18, to ammonia still 19. Anhydrous ammonia from ammonia still 19 passed via line 23 to an ammonia storage area where said anhydrous ammonia was stored in a conventional spherical ammonia storage zone 24. The thus recovered ammonia was used as a source of feed ammonia for feeding into reaction zone 7 via line 6. (Where starting a run in a new plant where no ammonia had been accumulated from a prior run it is necessary to use ammonia from another source.) Water passed from still 19 via line 21 to a sewer (not shown).

Concentrated aqueous mother liquor passed from flash zone 11, via line 33, pump 35, flow divider 37, and line 41, to reaction zone 1. Flow divider 37 provided a means whereby any portion, or all, or none of the concentrated mother liquor can be diverted from reaction zone 1 to storage tank 43.

The flow rate of concentrated mother liquor fed into reaction zone 1 via line 41 and the rate of sodium hydroxide solution fed into reaction zone 1 via line 4 can be adjusted to maintain a sodium hydroxide concentration at from a slight excess over the stoichiometric requirements to excesses up to 100%.

The water balance (the ratio of water vaporized from aqueous mother liquor in flash chamber 11 to water retained in the concentrated mother liquor) was adjusted by adjusting the pressure maintained in said flash chamber; the lower the pressure (at any given temperature) the greater the portion of water which passes into the vapor phase. Said ratio could also be adjusted by adjusting the temperature of the mother liquor which was fed into said flash chamber, or by adjusting both said temperature and said pressure. The higher the temperature (at any given pressure) the greater the portion of water which passes into the vapor phase.

The process of my invention evolved from my completely unobvious and unexpected discovery that addition of ammonia to a system consisting essentially of NTANa₃, NaOH and water causes the precipitation of NTANa₃.

NTANa₃ precipitated according to the process of my invention has been used with excellent results as a sequestering agent in household detergents including dishwashing compositions.

The process of this invention can be operated with excellent results where using pressures above about 500 pounds per square inch absolute; however, pressures above about 500 pounds per square inch are not economically attractive because of the cost (capital investment) of high pressure apparatus.

As used herein, the term "percent (%)" means parts per hundred by weight, and the term "parts," as used herein, means part by weight unless otherwise defined where used.

As used herein the term "grams per liter (g.p.l.)" means grams per liter of solution.

All pressures are absolute pressures unless otherwise specified where the pressure is stated.

I claim:

1. A process for precipitating sodium nitrilotriacetate from an aqueous solution consisting essentially of (a) water, (b) 100–500 grams per liter of sodium nitrilotriacetate, (c) about 1.5–60 grams per liter of sodium hydroxide, and (d) less than about 10 grams per liter of ammonia, comprising adjusting the ammonia concentration of said aqueous solution to about 50–300 grams per liter while maintaining the temperature of said aqueous solution within the range of about 10–225° C.

2. A process for recovering solid sodium nitrilotriacetate from a first aqueous solution having a temperature of about 10–225° C. and consisting essentially of water, sodium nitrilotriacetate, and sodium hydroxide, the sodium nitrilotriacetate concentration being about 100–400 grams per liter, the sodium hydroxide concentration being about 1.5–60 grams per liter, and the ammonia concentration being less than about 10 grams per liter, comprising:

(a) adding ammonia to said first solution while maintaining the temperature thereof at about 10–225° C. to precipitate sodium nitrilotriacetate therefrom and to form an aqueous mother liquor consisting essentially of; (i) water, (ii) about 50–250 grams per liter of sodium nitrilotriacetate, (iii) about 1.5–60 grams per liter of sodium hydroxide, and (iv) about 50–300 grams per liter of ammonia; and (b) separating and recovering the precipitated sodium nitrilotriacetate.

3. The process of claim 2 in which the temperature of the first aqueous solution is about 95–125° C.

4. The process of claim 2 in which the sodium nitrilotriacetate concentration of the first aqueous solution is about 200–400 grams per liter.

5. The process of claim 2 in which the sodium hydroxide concentration of the first aqueous solution is about 5–30 grams per liter.

6. The process of claim 2 in which the first aqueous solution contains less than about 5 grams per liter of ammonia.

7. The process of claim 2 in which the temperature of the first aqueous solution is maintained within the range of about 85–150° C. while adding the ammonia thereto.

8. The process of claim 2 in which the sodium nitrilotriacetate concentration of the aqueous mother liquor is about 60–200 grams per liter.

9. The process of claim 2 in which the sodium hydroxide concentration of the mother liquor is about 10–40 grams per liter.

10. The process of claim 2 in which the ammonia concentration of the mother liquor is about 100–250 grams per liter.

References Cited

UNITED STATES PATENTS

| | | | |
|---|---|---|---|
| 3,409,666 | 11/1968 | Foreman | 260—534 E |
| 3,183,262 | 5/1965 | Senger et al. | 260—534 E |
| 3,061,628 | 9/1962 | Senger et al. | 260—534 E |
| 2,855,428 | 9/1958 | Senger et al. | 260—534 E |
| 2,631,165 | 3/1953 | Ploetz | 260—534 E |

OTHER REFERENCES

Technique of Organic Chemistry Separation and Purification, Part I, Weissberger, vol. III, pp. 747, 475.

LORRAINE A. WEINBERGER, Primary Examiner

J. L. DAVISON, Assistant Examiner